:::

(12) United States Patent
Nakajima

(10) Patent No.: US 11,345,192 B2
(45) Date of Patent: May 31, 2022

(54) TYRE

(71) Applicant: Sumitomo Rubber Industries, Ltd., Hyogo (JP)

(72) Inventor: Koichi Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 169 days.

(21) Appl. No.: 16/743,133

(22) Filed: Jan. 15, 2020

(65) Prior Publication Data

US 2020/0247191 A1 Aug. 6, 2020

(30) Foreign Application Priority Data

Feb. 6, 2019 (JP) .............................. JP2019-019992

(51) Int. Cl.
*B60C 11/13* (2006.01)
*B60C 11/03* (2006.01)

(52) U.S. Cl.
CPC ...... *B60C 11/1384* (2013.01); *B60C 11/0306* (2013.01)

(58) Field of Classification Search
CPC ... B60C 11/13; B60C 2011/133; B60C 11/01; B60C 2011/1338; B60C 2011/1307
See application file for complete search history.

(56) References Cited

U.S. PATENT DOCUMENTS

| 6,138,728 | A | 10/2000 | Miyazaki | |
|---|---|---|---|---|
| 2001/0032691 | A1* | 10/2001 | Ohsawa | B60C 11/13 152/209.18 |
| 2005/0072505 | A1* | 4/2005 | Takahashi | B60C 11/13 152/209.15 |
| 2006/0042738 | A1* | 3/2006 | Matsumoto | B60C 11/13 152/209.21 |

(Continued)

FOREIGN PATENT DOCUMENTS

| JP | 2004-276861 A | 10/2004 | |
|---|---|---|---|
| JP | 2006062408 A * | 3/2006 | ......... B60C 11/1384 |

(Continued)

OTHER PUBLICATIONS

JP 2006062408 Machine Translation, Ohashi, Toshiyuki (Year: 2006).*

(Continued)

*Primary Examiner* — Robert C Dye
*Assistant Examiner* — Nicholas J Weiler
(74) *Attorney, Agent, or Firm* — Studebaker & Brackett PC

(57) ABSTRACT

It is a tyre 1 provided in a tread portion 2 with blocks 3 having ground contacting surfaces (3*a*). At least one of the blocks 3 is provided with a chamfered portion 7 formed in such a manner that a corner portion (3*k*), where a vertical wall surface (3*b*), a lateral wall surface (3*c*), and the ground contacting surface (3*a*) intersect with each other, is cut out obliquely, and a chamfer edge 8 where the chamfered (Continued)

portion 7 and the ground contacting surface (3a) intersect. The chamfered portion 7 is provided with a plurality of first concave portions 9 extending inwardly in a tyre radial direction from the ground contacting surface (3a). The first concave portions 9 have wavy shapes having amplitudes in a longitudinal direction of the chamfer edge 8.

17 Claims, 7 Drawing Sheets

(56) References Cited

U.S. PATENT DOCUMENTS

2014/0318676 A1* 10/2014 Kawakami .......... B60C 11/1384
152/209.15
2015/0059942 A1 3/2015 Takei

FOREIGN PATENT DOCUMENTS

WO 2012/043036 A1 4/2012
WO 2013150783 A1 10/2013

OTHER PUBLICATIONS

The extended European search report issued by the European Patent Office dated Jun. 9, 2020, which corresponds to European Patent Application No. 20153189.4-1012 and is related to U.S. Appl. No. 16/743,133.

* cited by examiner

TYRE

TECHNICAL FIELD

The present invention relates to a tyre provided with blocks in a tread portion.

BACKGROUND ART

Patent Literature 1 shown below describes a tyre in which two convex portions which are arranged in parallel and adjacent to each other in a tread circumferential direction and each extending from one of sidewall portions to its adjacent one of tread edges on a surface of a buttress portion. In this type of tyre, the convex portions exert an edge effect, therefore, traction performance on a snowy road surface is improved.

PRIOR ART DOCUMENT

Patent Literature

[Patent Literature 1]
International Publication No. 2013/150783

SUMMARY OF THE INVENTION

Problems to be Solved by the Invention

In recent years, there has been a demand for further improvement of on-snow performance of tyres. The inventors conducted various experiments and found that improving the tread portion to which a large ground contact pressure is applied is suitable for improving the on-snow performance.

The present invention was made in view of the above, and a primary object thereof is to provide a tyre capable of improving the on-snow performance.

Means for Solving the Problems

The present invention is a tyre including a tread portion and the tread portion is provided with blocks having ground contacting surfaces, wherein at least one of the blocks includes a vertical wall surface connected with the ground contacting surface thereof and extending in a tyre circumferential direction and a lateral wall surface connected with the ground contacting surface thereof and extending in a tyre axial direction, the at least one of the blocks is provided with a chamfered portion formed in such a manner that a corner portion, where the vertical wall surface, the lateral wall surface, and the ground contacting surface intersect with each other, is cut out obliquely, and a chamfer edge where the chamfered portion and the ground contacting surface intersect, the chamfered portion is provided with a plurality of first concave portions extending inwardly in a tyre radial direction from the ground contacting surface, and the first concave portions have wavy shapes having amplitudes in a longitudinal direction of the chamfer edge.

In the tyre according to the present invention, it is preferred that the ground contacting surface of the at least one of the blocks is provided with at least one terminating groove extending from an outer end in the tyre radial direction of at least one of the first concave portions and terminating within the at least one of the blocks.

The present invention is a tyre including a tread portion and the tread portion is provided with blocks having ground contacting surfaces, wherein at least one of the blocks includes a vertical wall surface connected with the ground contacting surface thereof and extending in a tyre circumferential direction and a lateral wall surface connected with the ground contacting surface thereof and extending in a tyre axial direction, the at least one of the blocks is provided with a chamfered portion formed in such a manner that a corner portion, where the vertical wall surface, the lateral wall surface, and the ground contacting surface intersect with each other, is cut out obliquely, and a chamfer edge where the chamfered portion and the ground contacting surface intersect, the chamfered portion is provided with a plurality of second concave portions extending in a longitudinal direction of the chamfer edge, and the second concave portions have wavy shapes having amplitudes in a direction orthogonal to the chamfer edge.

In the tyre according to the present invention, it is preferred that the tread portion has a first tread edge and a second tread edge, the blocks include first shoulder blocks arranged closest to the first tread edge and second shoulder blocks arranged closest to the second tread edge.

In the tyre according to the present invention, it is preferred that in at least one of the first shoulder blocks, the chamfered portion is provided on a first side in the tyre circumferential direction of the at least one of the first shoulder blocks, and in at least one of the second shoulder blocks, the chamfered portion is provided on a second side, which is opposite to the first side, in the tyre circumferential direction of the at least one of the second shoulder blocks.

In the tyre according to the present invention, it is preferred that an angle between the chamfered portion and the ground contacting surface of the at least one of the blocks is 5 degrees or more and 70 degrees or less.

In the tyre according to the present invention, it is preferred that depths of the first concave portions or the second concave portions are each 0.5 mm or more and 3 mm or less.

In the tyre according to the present invention, it is preferred that shapes of lateral cross sections of the first concave portions or the second concave portions taken perpendicular to longitudinal directions thereof are V-shapes.

In the tyre according to the present invention, it is preferred that shapes of lateral cross sections of the first concave portions or the second concave portions taken perpendicular to longitudinal directions thereof are arc-shapes.

In the tyre according to the present invention, it is preferred that shapes of lateral cross sections of the first concave portions or the second concave portions taken perpendicular to longitudinal directions thereof are polygonal-shapes each having four angles or more.

In the tyre according to the present invention, it is preferred that a length in the tyre circumferential direction of the chamfered portion and a length in the tyre axial direction of the chamfered portion are each 10% or more and 50% or less of a length in the tyre circumferential direction of the at least one of the blocks.

Effects of the Invention

The blocks of the tyre of the present invention is each provided with the chamfered portion formed in such a manner that the corner portion, where the vertical wall surface, the lateral wall surface, and the ground contacting surface intersect with each other, is cut out obliquely, and the chamfer edge where the chamfered portion and the ground contacting surface intersect. Further, the chamfered portion is provided with a plurality of the first concave portions extending radially inwardly from the ground contacting surface. The chamfered portion and the first concave portions configured as such increase volumes of snow blocks formed by the vertical wall surface and the lateral wall surface, therefore, large snow blocks can be formed.

Each of the first concave portions has the wavy shape with the amplitude in the longitudinal direction of the chamfer edge. The first concave portions configured as such can catch snow in the chamfered portions without letting the snow escape when the blocks touch the ground. Thereby, firm snow blocks are formed in the chamfered portions.

Therefore, in the tyre of the present invention, in the tread portion to which a large ground contact pressure is applied, snow shearing force can be increased, thereby, it has excellent on-snow performance.

MODE FOR CARRYING OUT THE INVENTION

An embodiment of the present invention will now be described in conjunction with accompanying drawings.

Figure 1:
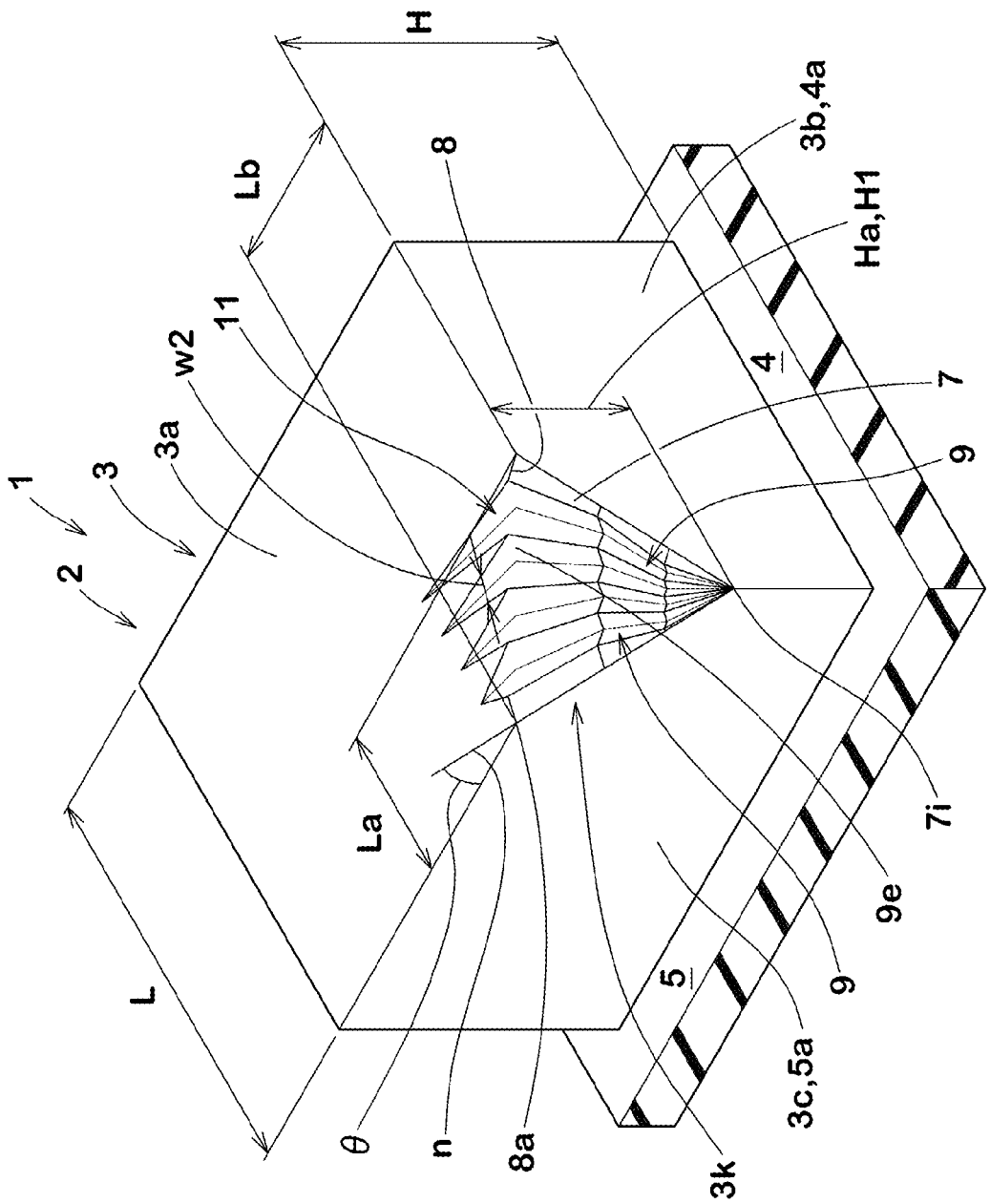
FIG. 1 A perspective view of one of blocks of a tyre as an embodiment of the present invention.

FIG. 1 is a perspective view one of blocks 3 provided in a tread portion 2 of a tyre 1 of the present embodiment. As a preferred embodiment, one of the blocks 3 of the pneumatic tyre 1 for a passenger car is shown in FIG. 1. However, the present invention can be applied to the pneumatic tyres 1 for heavy loads and the tyres 1 in other categories, for example.

As shown in FIG. 1, the blocks 3 in the present embodiment are each formed in a substantially rectangular parallelepiped shape. The blocks 3 are not limited to such a configuration, and various shapes such as a polygonal shape and a V-shape can be selected for a ground contacting surface (3a) which is to be in contact with the road surface.

Each of the blocks 3 in the present embodiment includes the ground contacting surface (3a), vertical wall surfaces (3b) connected with the ground contacting surface (3a) and extending in a tyre circumferential direction, and lateral wall surfaces (3c) connected with the ground contacting surface (3a) and extending in a tyre axial direction, for example.

The vertical wall surfaces (3b) are formed as groove walls (4a) of vertical grooves 4 extending in the tyre circumferential direction and provided in the tread portion 2, for example. The lateral wall surfaces (3c) are formed as groove walls (5a) of lateral grooves 5 extending in the tyre circumferential direction and provided in the tread portion 2, for example. In this specification, "extending in the tyre circumferential direction" means, of course, an embodiment of extending in parallel with the tyre circumferential direction, and preferably an embodiment of extending at an angle of 45 degrees or less, more preferably at an angle of 30 degrees or less, further preferably at an angle of 15 degrees or less with respect to the tyre circumferential direction. Similarly, "extending in the tyre axial direction" means, of course, an embodiment of extending in parallel with the tyre axial direction, and preferably an embodiment of extending at an angle of 45 degrees or less, more preferably at an angle of 30 degrees or less, further preferably at an angle of 15 degrees or less with respect to the tyre axial direction.

Each of the blocks 3 in the present embodiment includes a chamfered portion 7 formed in such a manner that a corner portion (3k), where one of the vertical wall surfaces (3b), one of the lateral wall surfaces (3c), and the ground contacting surface (3a) intersect with each other, is cut out obliquely, and a chamfer edge 8 where the chamfered portion 7 and the ground contacting surface (3a) meet. The chamfered portions 7 configured as such further increase volumes of snow blocks formed by the vertical wall surfaces (3b) and the lateral wall surfaces (3c) (the vertical grooves 4 and the lateral grooves 5), therefore, large snow blocks can be formed. Each of the chamfered portions 7 in the present embodiment is formed in a triangular shape.

Each of the chamfered portions 7 in the present embodiment is provided with a plurality of first concave portions 9 extending inwardly in a tyre radial direction from the ground contacting surface (3a). The first concave portions 9 configured as such further increase volumes of the snow blocks formed by the vertical wall surfaces (3b) and the lateral wall surfaces (3c).

Figure 2:
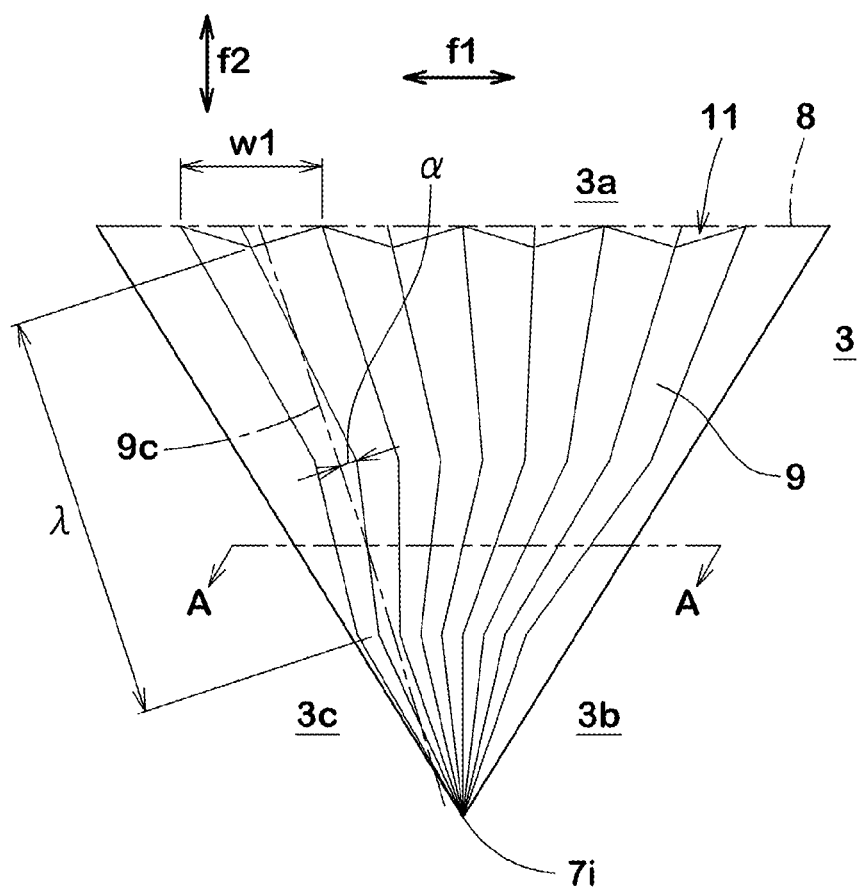
FIG. 2 A front view of a chamfered portion of FIG. 1.

FIG. 2 is a front view of the chamfered portion 7. As shown in FIG. 1 and FIG. 2, each of the first concave portions 9 has a wavy shape having an amplitude in a longitudinal direction (f1). The first concave portions 9 configured as such can catch snow in the chamfered portion 7 without letting the snow escape when the blocks 3 touch the ground. Thereby, a firm snow block is formed in the chamfered portion 7 in the present embodiment. Therefore, in the tyre 1 of the present embodiment, a large snow shearing force is exerted in the tread portion 2 to which a large ground contact pressure is applied, thereby, the on-snow performance is improved. Note that, in the present specification, a direction orthogonal to the chamfer edge 8 (hereinafter may simply be referred to as "orthogonal direction") is defined as (f2).

The first concave portions 9 in the present embodiment extend from the chamfer edge 8 to an inner end (7i) in the tyre radial direction of the chamfered portion 7. Note that the first concave portions 9 are not limited to such a configuration and they may terminate without reaching the inner end (7i), for example. If a height (H1) in the tyre radial direction of each of the first concave portions 9 is 80% or more of a height (Ha) in the tyre radial direction of the chamfered portion 7, an effective effect is exerted.

Each of the first concave portions 9 includes a concave portion wall 12 extending in a depth direction from the chamfered portion 7 and vertical edges 13 (shown in FIGS. 3A to 3c) arranged on both sides in the longitudinal direction (f1) of the concave portion wall 12 and extending in the tyre radial direction.

The first concave portions 9 in the present embodiment are arranged continuously so as to be in contact with each other in the longitudinal direction (f1). The first concave portions 9 configured as such increase the volumes of the snow blocks.

Figure 3A:
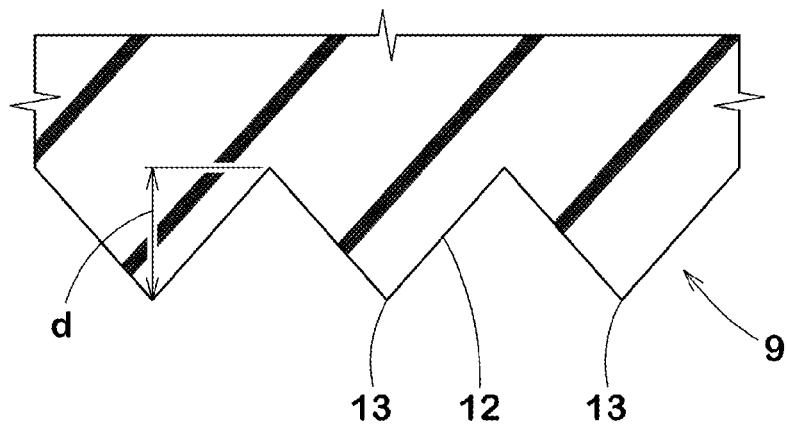
FIG. 3A A cross-sectional view taken along A-A line of FIG. 2.

FIG. 3A is a cross-sectional view taken along A-A line (a cross-sectional view perpendicular to longitudinal directions of the first concave portions 9) of FIG. 2. As shown in FIG. 3A, each of the first concave portions 9 has a V-shaped cross section, for example. In the first concave portions 9 configured as such, snow in the concave portion thereof is easy to be discharged by using the concave portion wall 12, therefore, the on-snow performance is improved. In the present embodiment, the concave portion wall 12 extends linearly and obliquely in the depth direction from both vertical edges 13.

Figure 3B:
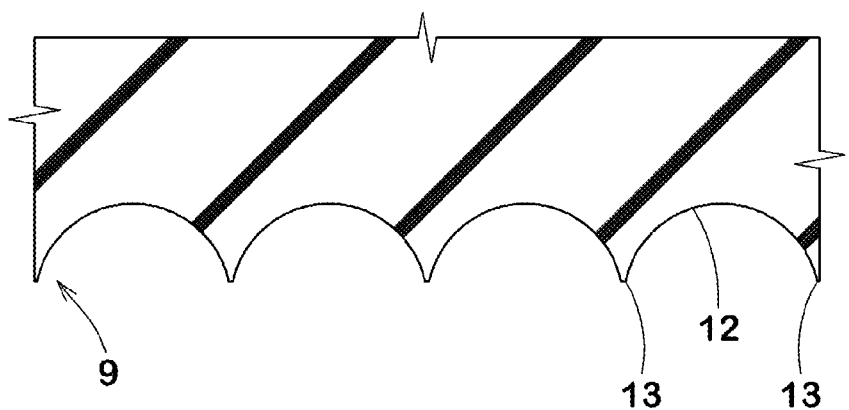
FIG. 3B A cross-sectional view of first concave portions according to another embodiment.
Figure 3C:
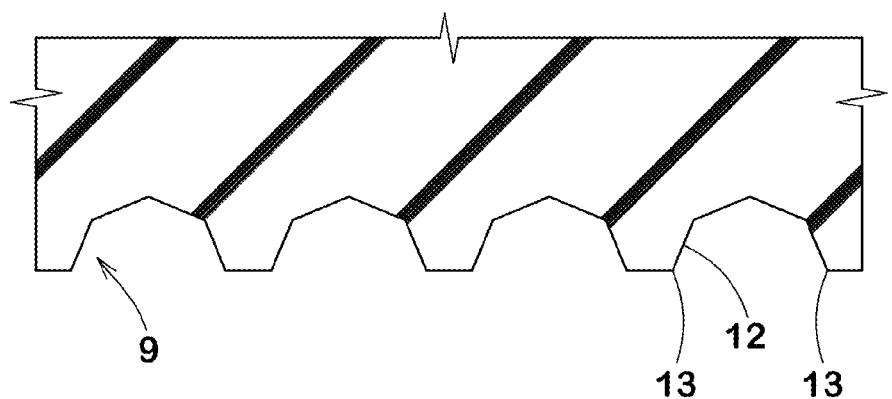
FIG. 3C A cross-sectional view of the first concave portions according to yet another embodiment.

FIGS. 3B and 3c are lateral cross-sectional views of the first concave portions 9 according to another embodiments. Each of the first concave portions 9 may have a cross section having an arc shape as shown in FIG. 3B or a polygonal shape with four angles or more as shown in FIG. 3C (a pentagonal shape in FIG. 3c), for example. In the embodiments shown in FIGS. 3B and 3c, the volumes of the snow locks formed by the first concave portions 9 are further increased.

It is preferred that a depth (d) of each of the first concave portions 9 is 0.5 mm or more and 3 mm or less. If the depth (d) of each of the first concave portions 9 is less than 0.5 mm, it is possible that snow cannot be caught effectively. If the depth (d) of each of the first concave portions 9 is more than 3 mm, rigidity of the chamfered portion 7 positioned adjacently to the first concave portions 9 is decreased, therefore, it is possible that firm snow blocks cannot be formed by the first concave portions 9 and the chamfered portion 7. The depth (d) is a maximum depth of each of the first concave portions 9.

As shown in FIG. 1 or FIG. 2, the depth (d) of each of the first concave portions 9 in the present embodiment is decreased gradually and radially inwardly. The first concave portions 9 configured as such suppress rigidity decrease of the chamfered portion 7 on a side of the inner end (7i) and therefore enable formation of firm snow blocks. From the similar point of view, a width (w1) in the longitudinal direction (f1) of each of the first concave portions 9 is decreased gradually and continuously toward the bottom portion in the depth direction, for example. Further, the width (w1) of each of the first concave portions 9 is decreased gradually and continuously toward the bottom portion in the depth direction.

An amplitude center line (9c) of each of the first concave portions 9 extends from the chamfer edge 8 toward the inner end (7i) of the chamfered portion 7. In the first concave portions 9 configured as such, lengths of the vertical edges 13 of the first concave portions 9 are maintained to be large, therefore, large snow shearing force is exerted.

Although not particularly limited, in order to effectively exert the effects described above, it is preferred that a maximum amplitude (a half amplitude with respect to a peak-to-peak amplitude) a of each of the first concave portions 9 is 10% or more and 15% or less of a wavelength λ of each of the first concave portions 9.

Although not particularly limited, it is preferred that a length (La) in the tyre circumferential direction and a length (Lb) in the tyre axial direction of the chamfered portion 7 are each 10% or more and 50% or less of a length (L) in the tyre circumferential direction of each of the blocks 3, for example. If the length (La) and the length (Lb) of the chamfered portion 7 are each less than 10% of the length (L) of each of the blocks 3, the volume of the snow block formed by the chamfered portion 7 is decreased, therefore, it is possible that the snow shearing force cannot be increased. If the length (La) and the length (Lb) of the chamfered portion 7 are each more than 50% of the length (L) of each of the blocks 3, the rigidity of the blocks 3 is decreased, therefore, it is possible that the snow blocks formed by the chamfered portion 7 cannot be compacted firmly. Thereby, it is further preferred that the length (La) in the tyre circumferential direction of the chamfered portion 7 and the length (Lb) in the tyre axial direction of the chamfered portion 7 are each 20% or more and 40% or less of the length (L) in the tyre circumferential direction of each of the blocks 3.

From the similar point of view, the height (Ha) in the tyre radial direction of the chamfered portion 7 is preferably 80% or more and 95% or less and further preferably 85% or more and 90% or less of a height (H) of each of the blocks 3.

It is preferred that an angle θ between the chamfered portion 7 and the ground contacting surface (3a) is 5 degrees or more and 70 degrees or less. If the angle θ is less than 5 degrees, it is possible that the volumes of the snow blocks formed by the chamfered portion 7 are decreased. If the angle θ is more than 70 degrees, effect of compacting snow by the chamfered portion 7 is decreased, therefore, it is possible that the shearing force by the chamfered portion 7 is decreased. In this specification, the angle θ is an angle between the ground contacting surface (3a) and an imaginary line (n) passing through the inner end (7i) of the chamfered portion 7 and a vertex (8a) on the chamfer edge 8.

Each of the blocks 3 in the present embodiment is provided with terminating grooves 11 extending from outer ends (9e) in the tyre radial direction of the first concave portions 9 and terminating within the ground contacting surface (3a). The terminating grooves 11 configured as such not only increase the snow shearing force but also promote the deformation of the first concave portions 9 and consequently promote the discharge of the snow in the concave portions.

In the present embodiment, a plurality of the terminating grooves 11 are provided, and each of them extends from a respective one of the first concave portions 9. Each of the terminating grooves 11 in the present embodiment extends in the same direction. The terminating grooves 11 extend in the tyre axial direction, for example. The terminating grooves 11 configured as such exert large traction on a snowy road.

Although not particularly limited, in order to suppress excessive decrease in the rigidity of the blocks 3, it is preferred that a width (w2) (maximum width) of each of the terminating grooves 11 is smaller than the width (w1) of each of the first concave portions 9. It is preferred that the width (w2) of each of the terminating grooves 11 is 40% or more and 100% or less of the width (w1) of each of the first concave portions 9, for example.

Figure 4:
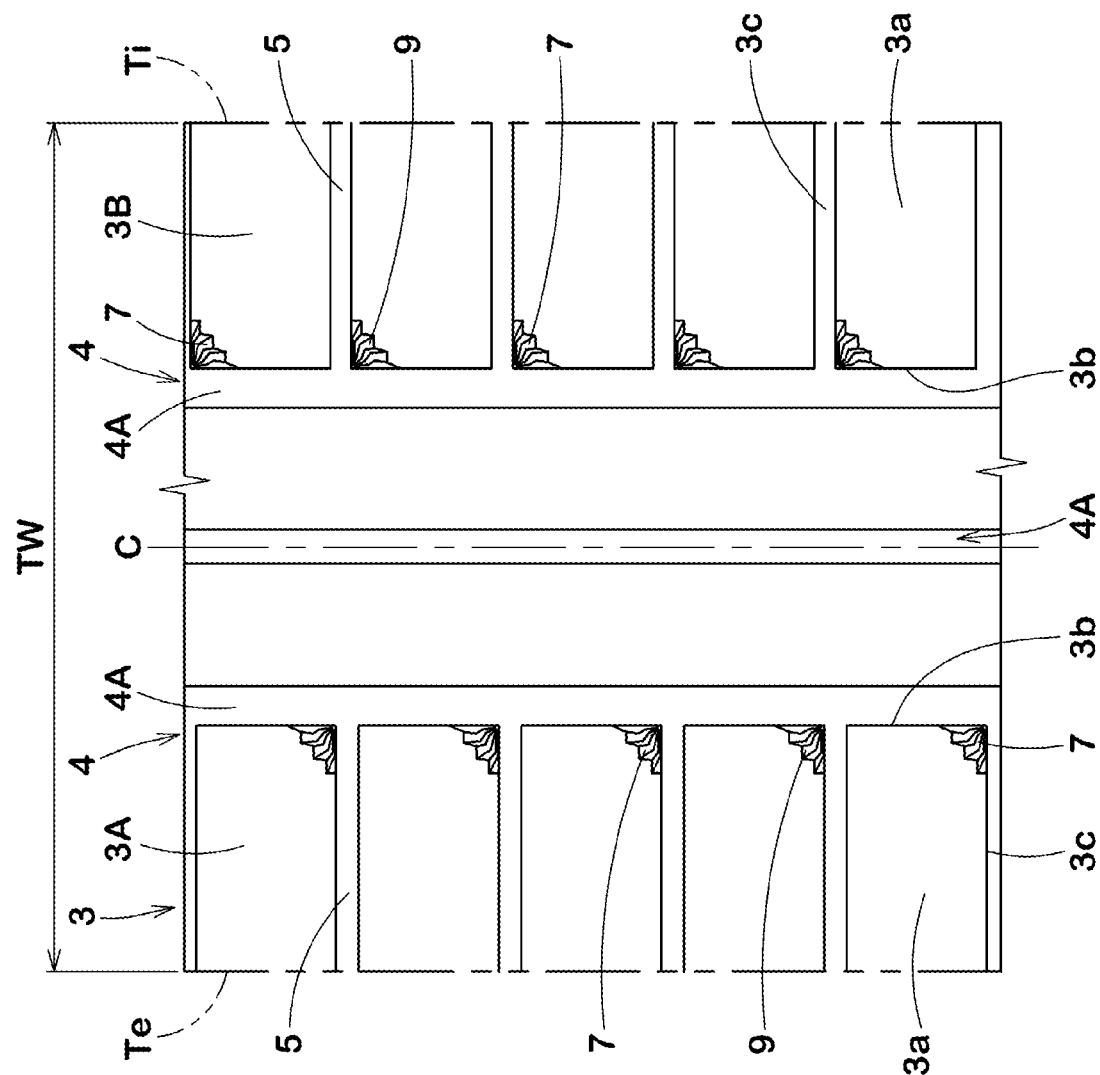
FIG. 4 A development view of the tread portion provided with the blocks of FIG. 1.

FIG. 4 is an overall development view of the tread portion 2 including the blocks 3 in the present embodiment. As shown in FIG. 4, the tread portion 2 has a first tread edge (Te) (on the left side in the figure) and a second tread edge (Ti) (on the right side in the figure).

The "tread edges" (Te) and (Ti) are defined as outermost ground contacting positions in the tyre axial direction of the tyre 1 when the tyre 1 in a standard state, in which the tyre is mounted on a standard rim, inflated to a standard inner pressure, and loaded with no load, is in contact with a flat surface with zero camber angle by being loaded with a standard tyre load. A distance in the tyre axial direction between the tread edges (te) and (Ti) in the standard state is defined as a tread width TW. Unless otherwise noted, dimensions and the like of various parts of the tyre 1 are values measured in the standard state.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard tyre inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tyre is for a passenger car, the standard inner pressure is 180 kPa.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. When the tyre 1 is for a passenger car, the standard tyre load is a load corresponding to 88% of the above-mentioned loads.

In the tread portion 2 of the present embodiment, the blocks 3 are formed to include first shoulder blocks 3A arranged closest to the first tread edge (Te) and second shoulder blocks 3B arranged closest to the second tread edge (Ti). In the present embodiment, the first shoulder blocks 3A and the second shoulder blocks 3B are arranged in the tyre circumferential direction.

In each of the first shoulder blocks 3A of the present embodiment, the chamfered portion 7 is provided on a first side (lower side in FIG. 4) in the tyre circumferential direction of the first shoulder block 3A. Further, in each of the second shoulder blocks 3B of the present embodiment, the chamfered portion 7 is provided on a second side (the upper side in FIG. 4) opposite to the first side in the tyre circumferential direction of the second shoulder block 3B. In the tread portion 2 configured as such, the same shearing force is exerted by the chamfered portions 7 regardless of the direction in the tyre circumferential direction in which the tyre 1 rotates. Note that the chamfered portions 7 of the first shoulder blocks 3A and the second shoulder blocks 3B may be provided on the same side in the tyre circumferential direction. In such an embodiment, the same shearing force by the chamfered portions 7 is exerted on both sides in the tyre axial direction.

The tread portion 2 in the present embodiment is provided with one or more vertical main grooves 4A, three vertical main grooves 4A in the present embodiment, extending continuously in the tyre circumferential direction between the first shoulder blocks 3A and the second shoulder blocks 3B. In the present embodiment, is provided. Thereby, between each vertical main groove 4A, a rib-shaped land region 6 extending in the tyre circumferential direction is provided. Note that the tread portion 2 is not limited to such a configuration, and various forms can be adopted.

Figure 5:
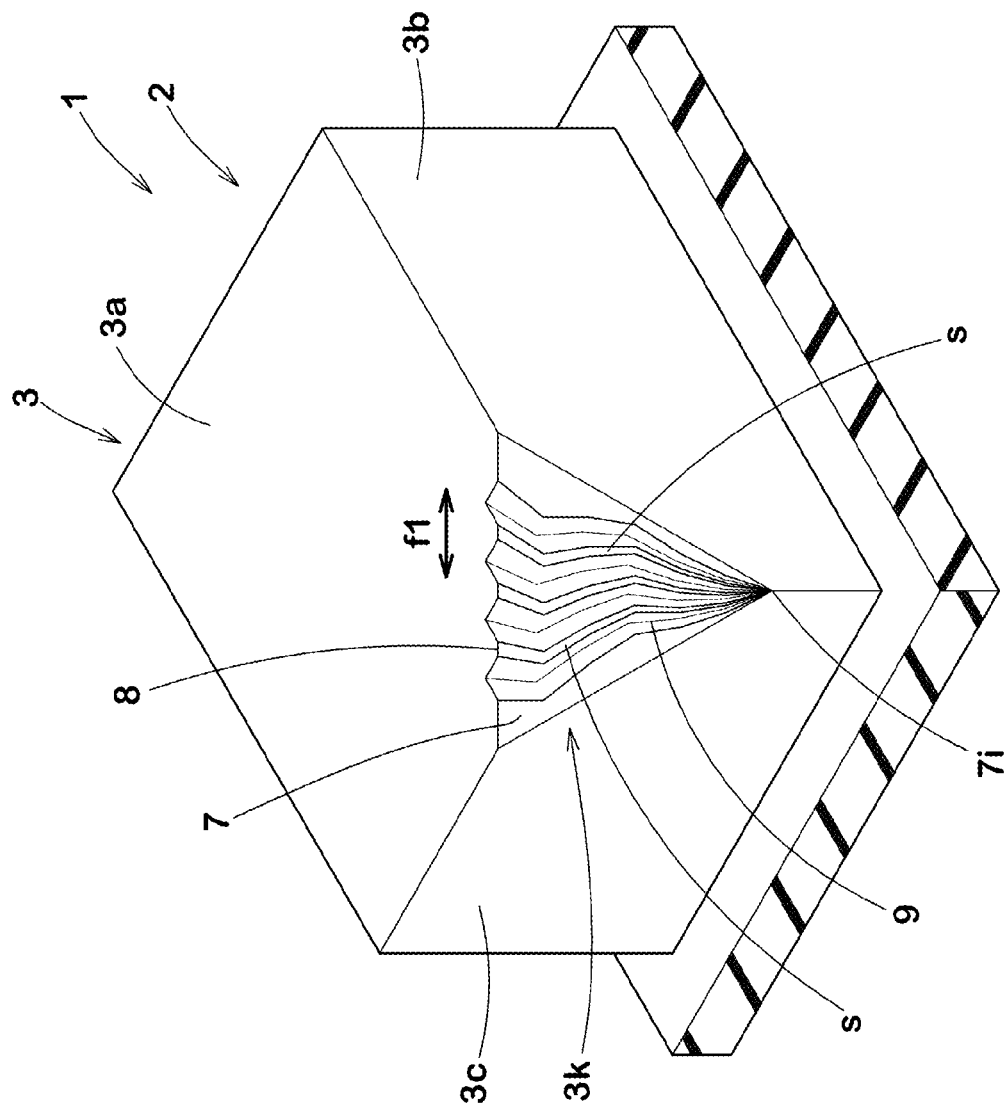
FIG. 5 A perspective view of one of the blocks according to another embodiment.

FIG. 5 is a perspective view of one of the blocks 3 provided with the first concave portions 9 according to another embodiment. In FIG. 5, the same reference numerals are given to the same components as the components of the present embodiment, and the description thereof is omitted. As shown in FIG. 5, in this embodiment, the first concave portions 9 are arranged in the longitudinal direction (f1) with gaps (s), which are formed in such a manner that the chamfer edge 8 is cut out, between each other. In such an embodiment, the rigidity of the blocks 3 is maintained higher.

Figure 6:
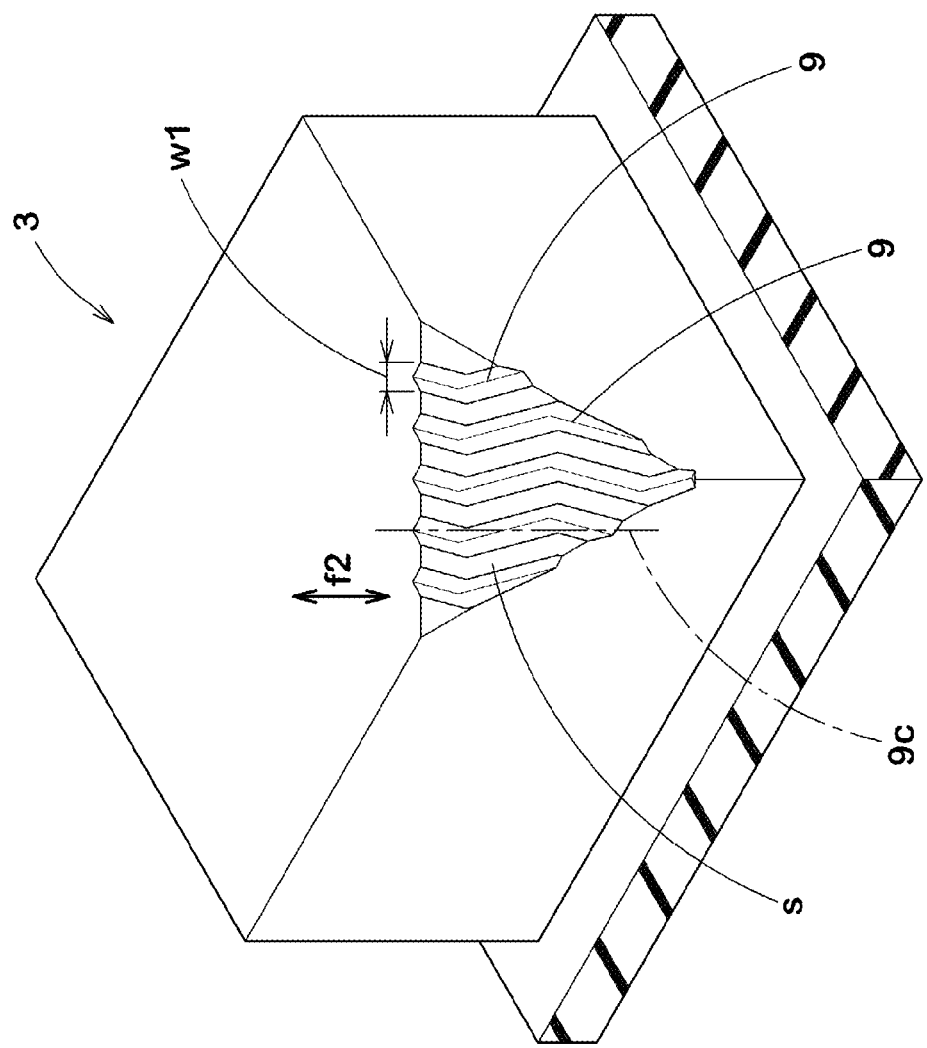
FIG. 6 A perspective view of one of the blocks according to further another embodiment.

FIG. 6 is a perspective view of one of the blocks 3 provided with the first concave portions 9 according to yet another embodiment. In FIG. 6, the same reference numerals are given to the same components as the components of the present embodiment, and the description thereof is omitted. As shown in FIG. 6, in this embodiment, the width (w1) in the longitudinal direction (f1) is formed to be constant in the tyre radial direction. Further, the first concave portions 9 are formed to have constant depths (not shown) in the tyre radial direction. The first concave portions 9 configured as such also increase the volumes of the snow blocks formed by the vertical wall surfaces (3b) and the lateral wall surfaces (3c), therefore, large snow blocks can be formed. In the present embodiment, the first concave portions 9 have their amplitude center lines (9c) extending in parallel with the orthogonal direction (f2).

Figure 7A:
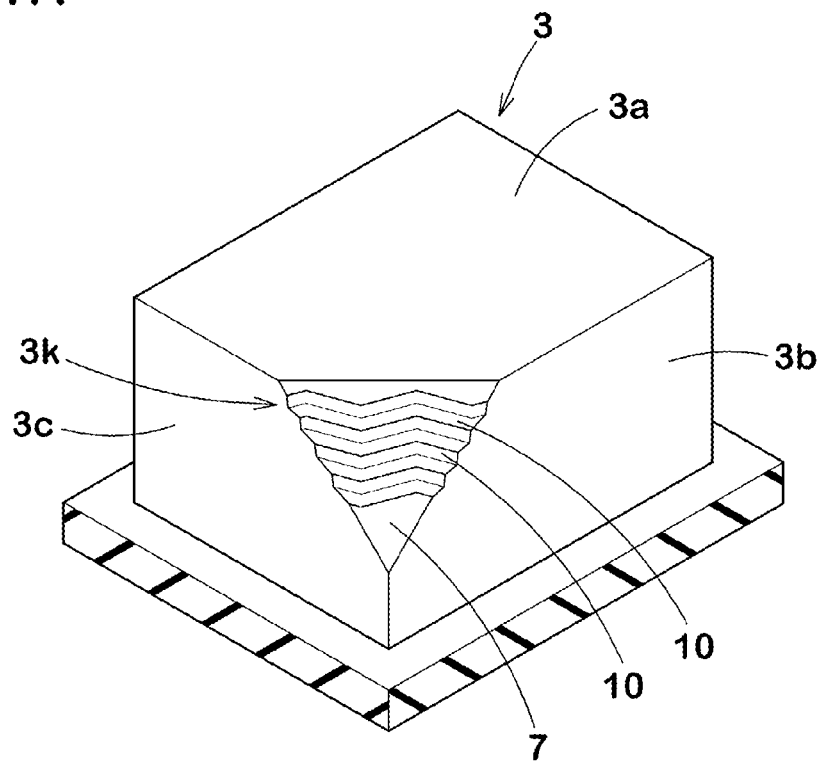
FIG. 7A A perspective view of one of the blocks provided with second concave portions.
Figure 7B:
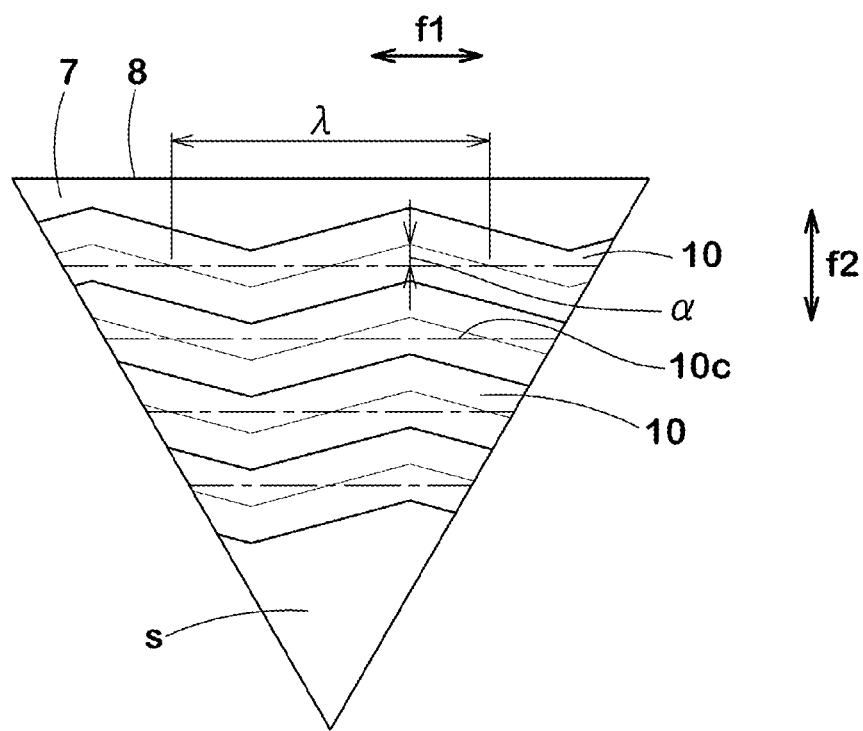
FIG. 7B A front view of the chamfered portion of FIG. 7A.

FIG. 7A is a perspective view of one of the blocks 3 according to another embodiment. FIG. 7B is a front view of the chamfered portion 7 provided in the block 3. As shown in FIGS. 7A and 7B, the chamfered portion 7 is provided with a plurality of second concave portions 10 extending in the longitudinal direction (f1) of the chamfer edge 8.

Each of the second concave portions 10 extends in a wavy manner with an amplitude in the orthogonal direction (f2). The second concave portions 10 configured as such can also catch the snow which easily escapes from the chamfered portion 7 when the blocks 3 come into contact with the ground, therefore, firm snow blocks are formed in the chamfered portion 7. Amplitude center lines (10c) of the second concave portions 10 extend in parallel with the longitudinal direction (f1), for example. It is preferred that the second concave portions 10 are formed such that the widths (w1), the depths (not shown), and a ratio between the half wavelength λ and the amplitude are within the same range as the first concave portions 9. Further, it is preferred that each of the second concave portions 10 has a lateral cross section perpendicular to a longitudinal direction thereof having an arc shape, a polygonal shape with four angles or more, or a v shape in the same manner as the lateral cross section of each of the first concave portions 9.

While detailed description has been made of a tyre according to embodiments of the present invention, the present invention can be embodied in various forms without being limited to the illustrated embodiments.

WORKING EXAMPLES

Tyres of size 215/60R16 having the basic pattern shown in FIG. 4 were made by way of test according to the specifications listed in Table 1, and then each of the test tyres was tested for the on-snow performance. Common specifications of the test tyres and the test methods were as follows.

Width (w1) of first concave portion or second concave portion: 3.4 mm

Maximum amplitude α of first concave portion or second concave portion/half wavelength λ: 11.5% (chamfer edge-side), 11.9% (chamfered portion's inner end-side)

Height (Ha) of chamfered portion/block height (H): 67%
Length (La) of chamfered portion/block length (L): 32%
Length (Lb) of chamfered portion/block length (L): 32%

<On-Snow Performance>

Each of the test tyres was mounted on all wheels of a front-wheel drive passenger car with a displacement of 1500 cc under the following conditions, and a test driver drove the above-mentioned vehicle on a test course of which road surface was covered with snow. The test driver evaluated running characteristics regarding steering response, traction, grip, and the like by the test driver's feeling during the test drive. The results are indicated by an evaluation point based on Reference 1 being 100, wherein a larger numerical value is better.

Rim (all wheels): 16×6.5 J
Inner pressure (all wheels): 240 kPa

TABLE 1

|  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- |
| Figure showing shape of block | FIG. 1 | FIG. 1 | FIG. 1 | FIG. 1 | FIG. 1 | FIG. 1 | FIG. 7 | FIG. 1 |
| Presence or Absence of Chamfered portion | Absence | Presence | Presence | Presence | Presence | Presence | Presence | Presence |
| Wavy or Non-wavy of First concave portion | — | Absence | Presence | Presence | Presence | Presence | — | Presence |
| Wavy or Non-wavy of Second concave portion | — | — | — | — | — | — | Presence | — |
| Depth of First concave portion or Second concave portion [mm] | — | 1 | 1 | 0.5 | 2 | 1 | 1 | 1 |
| Presence or Absence of Terminating groove | Absence | Absence | Absence | Absence | Absence | Presence | Absence | Absence |
| Angle θ of Chamfered portion [degree] | — | 18 | 18 | 18 | 18 | 18 | 18 | 70 |
| On-snow performance [evaluation point: larger is better] | 100 | 101 | 104 | 103 | 106 | 107 | 107 | 105 |

From the test results, it was confirmed that the tyres in the Examples had excellent on-snow performance.

DESCRIPTION OF REFERENCE SIGNS 1 tyre
2 tread portion
3a ground contacting surface
3b vertical wall surface
3c lateral wall surface
3k corner portion
7 chamfered portion
8 chamfer edge
9 first concave portion

The invention claimed is:

1. A tyre comprising a tread portion provided with blocks having ground contacting surfaces, wherein
at least one of the blocks includes a vertical wall surface connected with the ground contacting surface thereof and extending in a tyre circumferential direction and a lateral wall surface connected with the ground contacting surface thereof and extending in a tyre axial direction,
the at least one of the blocks is provided with a chamfered portion formed in such a manner that a corner portion, where the vertical wall surface, the lateral wall surface, and the ground contacting surface intersect with each other, is cut out obliquely, and a chamfer edge where the chamfered portion and the ground contacting surface intersect,
the chamfered portion is provided with a plurality of first concave portions extending inwardly in a tyre radial direction from the ground contacting surface, and
the first concave portions have wavy shapes having amplitudes in a longitudinal direction of the chamfer edge.

2. The tyre according to claim 1, wherein
the ground contacting surface of the at least one of the blocks is provided with at least one terminating groove extending from an outer end in the tyre radial direction of at least one of the first concave portions and terminating within the at least one of the blocks.

3. The tyre according to claim 2, wherein
a width of the at least one terminating groove is 40% or more and 100% or less of a width of the at least one of the first concave portions.

4. The tyre according to claim 1, wherein
the tread portion has a first tread edge and a second tread edge,
the blocks include first shoulder blocks arranged closest to the first tread edge and second shoulder blocks arranged closest to the second tread edge,
in at least one of the first shoulder blocks, the chamfered portion is provided on a first side in the tyre circumferential direction of the at least one of the first shoulder blocks, and
in at least one of the second shoulder blocks, the chamfered portion is provided on a second side, which is opposite to the first side, in the tyre circumferential direction of the at least one of the second shoulder blocks.

5. The tyre according to claim 1, wherein
an angle between the chamfered portion and the ground contacting surface of the at least one of the blocks is 5 degrees or more and 70 degrees or less.

6. The tyre according to claim 1, wherein
depths of the first concave portions are each 0.5 mm or more and 3 mm or less.

7. The tyre according to claim 1, wherein
shapes of lateral cross sections of the first concave portions taken perpendicular to longitudinal directions thereof are V-shapes, arc-shapes, or polygonal-shapes having four angles or more.

8. The tyre according to claim 1, wherein
a length in the tyre circumferential direction of the chamfered portion and a length in the tyre axial direction of the chamfered portion are each 10% or more and 50% or less of a length in the tyre circumferential direction of the at least one of the blocks.

9. The tyre according to claim 1, wherein
the first concave portions are arranged in the longitudinal direction of the chamfer edge with gaps, which are formed in such a manner that the chamfer edge is cut out, between each other.

10. The tyre according to claim 1, wherein
widths of the first concave portions in the longitudinal direction of the chamfer edge are constant in the tyre radial direction.

11. The tyre according to claim 1, wherein
maximum amplitudes of the first concave portions in the longitudinal direction of the chamfer edge are each 10% or more and 15% or less of a wavelength of at least one of the first concave portions.

12. The tyre according to claim 1, wherein
a height in the tyre radial direction of the chamfered portion is 80% or more and 95% or less of a height of the at least one of the blocks.

13. The tyre according to claim 1, wherein in each of the first concave portions, lengths of segments between points of intersection with an amplitude center line and peaks and valleys of a wave form of the each of the first concave portions gradually decrease from the ground contacting surface to a radially inner end of the each of the first concave portions.

14. The tyre according to claim 1, wherein
the ground contacting surface of the at least one of the blocks is provided with at least one terminating groove extending from an outer end in the tyre radial direction of at least one of the first concave portions and terminating within the at least one of the blocks, and
a valley line of a groove bottom of the at least one terminating groove has an angle smaller than an angle of a valley line of a groove bottom of the one of the first concave portions with respect to the ground contacting surface.

15. The tyre according to claim 1, wherein
the ground contacting surface of the at least one of the blocks is provided with terminating grooves each extending from an outer end in the tyre radial direction of a respective one of the first concave portions and terminating within the at least one of the blocks, and
distances in the tyre axial direction of terminating ends of all the terminating grooves from the vertical wall surface are larger than a length in the tyre axial direction of the chamfered portion.

16. The tyre according to claim 1, wherein
in each of the first concave portions, lengths of segments between points of intersection with an amplitude center line and peaks and valleys of a wave form of the each of the first concave portions gradually decrease from the ground contacting surface to a radially inner end of the each of the first concave portions,
the ground contacting surface of the at least one of the blocks is provided with at least one terminating groove extending from an outer end in the tyre radial direction of at least one of the first concave portions and terminating within the at least one of the blocks, and
a valley line of a groove bottom of the at least one terminating groove has an angle smaller than an angle of a valley line of a groove bottom of the one of the first concave portions with respect to the ground contacting surface.

17. The tyre according to claim 1, wherein
in each of the first concave portions, lengths of segments between points of intersection with an amplitude center line and peaks and valleys of a wave form of the each of the first concave portions gradually decrease from the ground contacting surface to a radially inner end of the each of the first concave portions,
the ground contacting surface of the at least one of the blocks is provided with terminating grooves each extending from an outer end in the tyre radial direction of a respective one of the first concave portions and terminating within the at least one of the blocks, and
distances in the tyre axial direction of terminating ends of all the terminating grooves from the vertical wall surface are larger than a length in the tyre axial direction of the chamfered portion.

* * * * *